United States Patent

Murphy, Jr. et al.

[15] 3,643,860
[45] Feb. 22, 1972

[54] YARDAGE INDICATOR FOR HANDCART

[72] Inventors: Robert H. Murphy, Jr., 6242 Lake Forest; William G. Goetz, 6346 Tanglewood, both of Grand Blanc, Mich. 48439

[22] Filed: Mar. 21, 1969

[21] Appl. No.: 809,123

[52] U.S. Cl. ............................................................235/95
[51] Int. Cl. .......................................................G01c 22/00
[58] Field of Search ..........................235/95, 96, 97; 33/141

[56] References Cited

UNITED STATES PATENTS

| | | | |
|---|---|---|---|
| 2,724,361 | 11/1955 | Coffin | 116/129 |
| 2,766,935 | 10/1956 | Klein | 235/95 |
| 3,202,353 | 8/1965 | Nowak et al. | 235/95 |
| 3,250,466 | 5/1966 | Tomlinson | 235/95 |
| 3,458,128 | 7/1969 | Tillman | 235/95 |

*Primary Examiner*—Stephen J. Tomsky
*Attorney*—Barnard, McGlynn & Reising

[57] ABSTRACT

A yardage indicator to be mounted on a manually driven handcart, such as a golf cart, having a friction wheel adapted to ride on either wheel of the cart to drive a reduction gear mechanism as the cart wheel rotates, the output of which is connected to a pointer which rotates around a dial to accurately and visually indicate the yardage traveled by the cart. The pointer is frictionally connected to the gear mechanism output shaft to permit a manual resetting of the pointer to any mark on the dial without affecting the gear mechanism. The indicator is provided with adjustable mounting means to compensate for different cart designs and different diameters and tracks of cart wheels.

2 Claims, 6 Drawing Figures

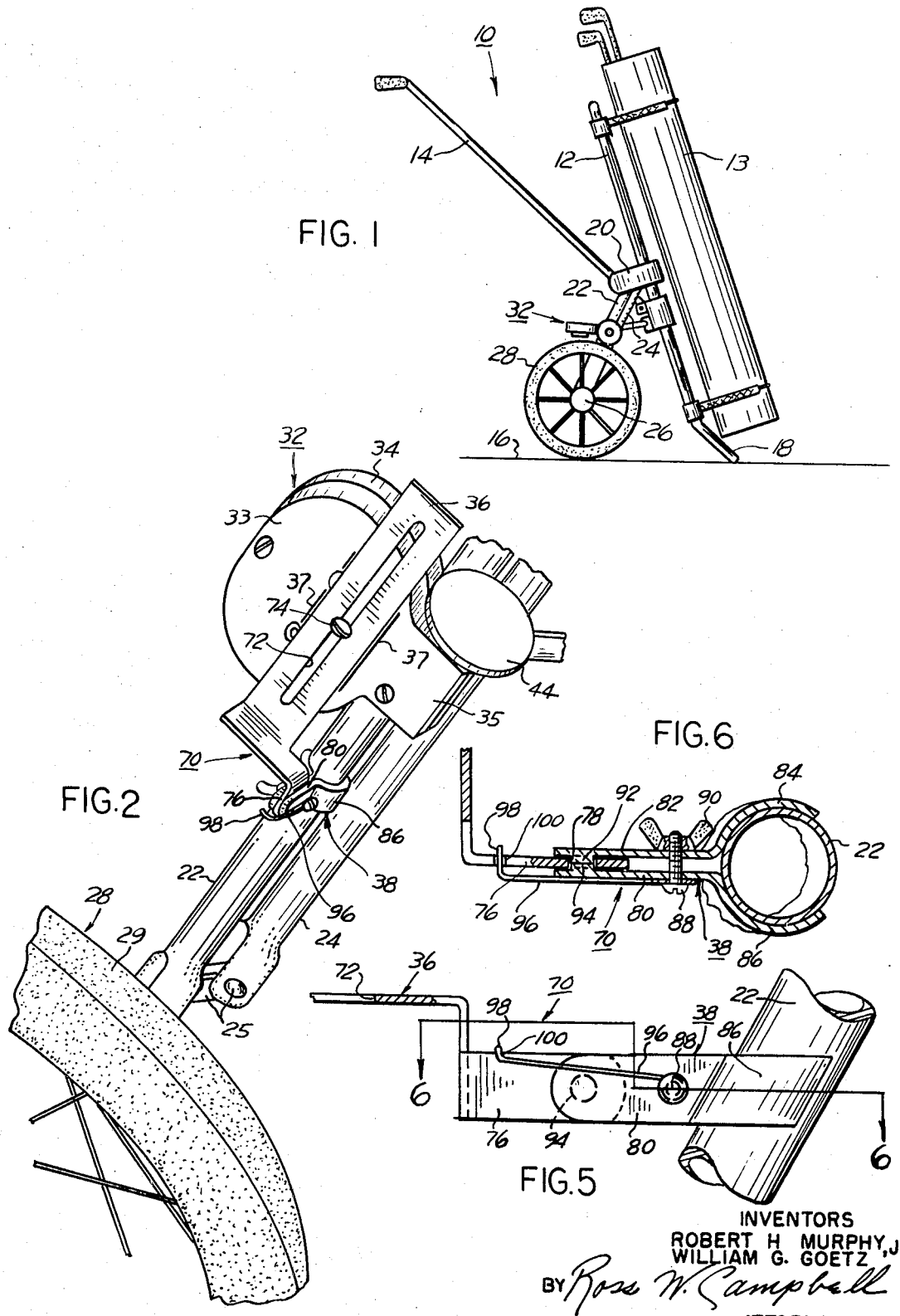

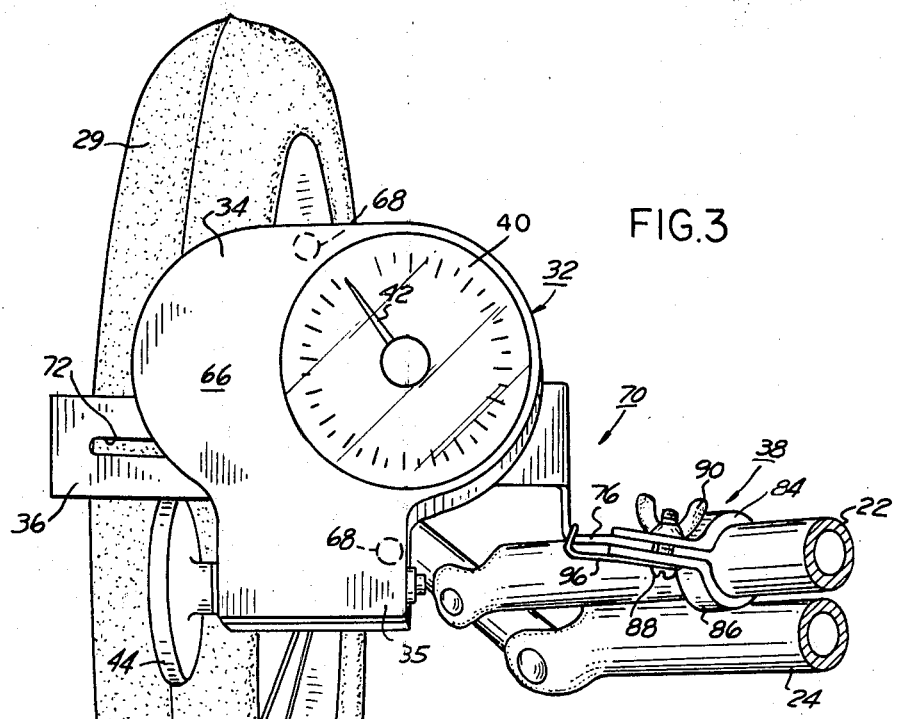
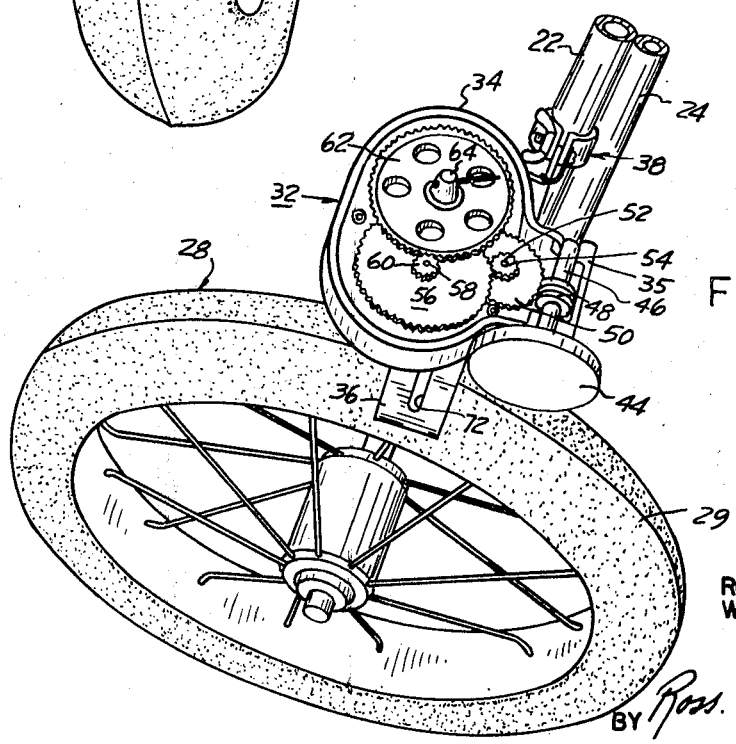

YARDAGE INDICATOR FOR HANDCART

BACKGROUND OF THE INVENTION

1. Field of the Invention

The invention refers in general to odometers for measuring actual distances traveled by a ground vehicle and more in particular to a yardage measuring device for a manually propelled handcart, such as, for instance, a golf cart.

2. Description of the Prior Art

Yardage indicators for handcarts are known in the art, especially as applied to manually propelled golf carts. Devices of this type are known which are attached to the golf cart to accurately indicate to a person operating the golf cart on a golf course the distance he has to move his cart from the position where the ball has been hit to where the ball comes to rest along the fairway or on the green, thus permitting the player, since the distance between the holes is known, to determine the remaining distance to the next hole and thereby enable him to select the proper club for his next shot.

Known devices of this type are, for example, disclosed in U.S. Pat. Nos. 2,724,361 to R. S. Coffin; 3,202,353 to J. E. Nowack et al. and 3,250,466 to N. P. Tomlinson.

However, these known devices, although sufficiently accurate to measure and indicate the traveled distance, are nevertheless unsatisfactory for the desired purpose in that they are generally relatively expensive and provide difficulties in attachment to the cart unless the device is designed for a particular structure of cart. They are furthermore difficult or impossible to adjust to various wheel diameters and wheel tracks of the many different designs of carts available. If used with a foldable golf cart, the known devices have to be disassembled before the cart can be folded, thus further increasing the inconvenience which hitherto prevented these devices from general acceptance.

SUMMARY OF THE INVENTION

The present invention provides a universally adaptable improved yardage indicator for various designs of handcarts.

The present novel device consists of a housing enclosing a reduction gear mechanism, having an input shaft and an output shaft. Mounted to the input shaft is a friction wheel adapted to be placed in surface contact with a wheel of the handcart so as to be rotated thereby when the handcart is being moved and thereby drive the reduction gearing within the housing. The output shaft of the reduction gearing is connected to a pointer for rotation of the pointer at a rate determined by the ratio of the gearing. The pointer is adapted to travel around a dial provided outside of the housing, which is circumferentially provided with indicia for indicating the distance traveled by the cart. The housing is mounted on a bracket which, when installed for actuation of the device, overlies the wheel of the cart horizontally and which is provided with a longitudinal slot along which the housing can be moved to accommodate various wheel spacings. The housing bracket is pivotally attached to a clamp adapted to secure the bracket to a strut of the cart along which the clamp is adjustable up or down to compensate for different wheel diameters.

A primary feature of the present novel device is the provision of spring-loaded means to retain the device in operating position on the cart wheel, and permitting the device to be swung into an inoperative position alongside the strut of the cart when the cart is to be folded together, thus eliminating the bothersome necessity of having to detach the device if the cart has to be folded together.

Further novel features and distinctive advantages will become apparent by reference to the following detailed description in connection with the appended drawings.

BRIEF DESCRIPTION OF THE DRAWINGS

The accompanying drawings show a preferred embodiment in which:

FIG. 1 is a side elevational view of an exemplary handcart showing the present novel device in attached position in engagement with a wheel of the cart;

FIG. 2 is an enlarged perspective closeup view of a portion of the cart shown in FIG. 1 showing the device being swung out of position and into inactive position to enable folding of the cart;

FIG. 3 is a still further enlarged top view of the present novel indicator device shown in operating position on a wheel of the cart;

FIG. 4 is a perspective view showing the present novel device in operating position on a wheel of the cart with the top plate remove to illustrate the internal gear mechanism;

FIG. 5 is a front view of the clamping bracket used to attach the present novel device to the strut member of the cart permitting the device to be selectively swiveled and retained into an operative position on a wheel of the cart and into an inactive position for folding of the cart;

FIG. 6 is a cross section through the bracket and the strut member of the cart to more clearly show the construction of the bracket and the resilient retaining means as seen along line 6—6 of the structure shown in FIG. 5.

DESCRIPTION OF THE PREFERRED EMBODIMENT

With reference to the attached drawings, FIG. 1 illustrates the present novel device as being attached to a golf bag cart, which may be of conventional construction.

Golf bag carts, such as illustrated in FIG. 1, are known and usually comprise a framework of strut members which may be attached to each other in such way that the cart can be folded together to facilitate its transportation. These carts are generally used to carry the golf club bag in order to ease the burden of carrying a plurality of heavy golf clubs around the course.

As illustrated in the drawings, an exemplary golf cart 10 comprises a central vertical strut member 12 for the support of a golf bag 13 to which is attached a handle 14 for manual propelling of the cart along the ground 16 of the golf course. The strut 12 has a depending leg portion 18 for standing support of the cart.

Intermediate the upper and lower end of the central strut 12 are attached by means of a connecting member 20 two pairs of diagonal struts 22–24 respectively, which are each adapted to support at the lower ends a wheel axle 26 adapted to support a pair of oppositely disposed ground wheels 28–30 by which the cart 10 may be moved by pulling or pushing the handle 14.

The frame of the cart, as illustrated, is constructed such as to be folded together by means of joints 25 between the various strut members for convenient transport to and from the place of use.

The present novel yardage indicator device, which is generally indicated by the reference numeral 32, comprises a housing 34 mounted to a bracket 36 which is pivotally secured to an adjustable clamp 38 provided at one of the outer ones 22 of the pair of diagonal struts 22–24. In the drawings, the device is shown as being attached to the strut 22 to cooperate with the wheel 28. By means of the pivotal connection to the adjustable clamp 38, the indicator device 32 is able to be swung out of position as shown in FIG. 2 if it is desired to fold the cart 10 together.

In the operating position, the indicator device 32 overlies the wheel 28 and has a dial 40 inscribed on its face which cooperates with a rotatable pointer 42 to visually indicate the yardage traveled by the cart. To rotate the pointer 42, a frictional contact wheel 44 has provided outside of the housing 34 which in the operable position of the indicator device is adapted to be in frictional contact with the circumferential surface 29 of the wheel 28 by which, upon rotation of the wheel 28, the contact wheel 44 will be rotated to thus rotate the pointer 42 by means of a mechanism enclosed within the housing 34, which will presently be described.

With particular reference to FIG. 4, the frictional contact wheel 44 is integral with a worm shaft 46 which is supported for rotation within a housing annex 35 formed integrally with the main housing 34 at one side thereof so that the worm shaft is disposed in a direction transverse to the wheel 28. The worm shaft 46 is integrally provided with a worm gear 48 which is in constant mesh with a spur gear 50 rotatively supported on a shaft 52 which is disposed within the housing 34 along an axis normal to the axis of the worm shaft 46. The spur gear 50 is integrally provided with a reduction gear or pinion 54 supported on the same shaft 52 and which is in constant mesh with a larger gear 56 supported for rotation on a shaft 58 which is disposed parallel to the shaft 52 within the housing 34. The large gear 56, similar to the foregoing gear arrangement, is likewise provided integrally with a reduction gear or pinion 60 supported on the same shaft 58 which is adapted to be in constant mesh with the final drive gear 62, which comprises a large spur gear supported for rotation on a shaft which is disposed parallel to both shafts 52 and 58 within the housing. Frictionally engaged on the end of the shaft shaft which carries gear 62 within the housing 34 is a knob 64 which in turn carries a pointer 42. Knob 64 and pointer 42 normally rotate with the gear 62. However, the knob 64 is attached to the end of the shaft of gear 62 by a mere frictional engagement such that the knob 64 and the pointer 42 may be independently rotated relative to the shaft of gear 62, thus, to permit the pointer 42 to be reset manually without effecting rotation of the gear 62. During such resetting the worm gear 48 acts in the usual fashion to prevent rotation of any of the intermediate gears. The housing 34 and annex 35 are split along a central horizontal plane to provide a housing proper and a cover 66 which in assembly is attached to the housing proper by means of screws 68 (FIGS. 2 and 3) and on which the dial 40 is provided in registry with the underlying gear 62.

In operation, as the cart wheel 28 rotates, it turns the contact wheel 44 by frictional contact with the radial wheel surface 29. The contact wheel turns the worm gear 48, which in turn rotates spur gear 50 and reduction gear 54 integral therewith. The pinion gear 54 then rotates gear 56 and its associated pinion gear 60 which drives the final drive gear 62 to thus rotate the pointer 42 around the dial at an angular speed determined by the compound ratio of the reduction gearing in the housing 34. The pointer accurately measures and marks the yardage traveled by the wheel 28. As mentioned before, the pointer 42 can be manually reset to zero or to any mark on the dial 40. In this way, the golfer is able to set the respective hole yardage while on the tee by manually moving the pointer 42 to the respective mark on the dial. The pointer upon rotation, as the cart is moved along the fairway, will always accurately indicate the remaining yardage to the hole after each shot. Alternately, the rotation of the pointer can be changed from clockwise to counterclockwise by changing from a right-hand worm to a left-hand worm. For lightweight construction, the housing 34 could be made of aluminum and the gears of plastic material or both the housing and the gears could be made of a molded plastic material such as nylon.

With particular reference now to FIGS. 2, 3, 5 and 6, the present yardage indicator device 32 is adjustable attached and supported on a novel bracket assembly 70 which includes the elongated bracket 36 to which the indicator housing 34 is mounted and which is pivotally connected to the adjustable clamp 38 for adjustable securement to the strut 22.

The elongated bracket 36, as best seen in FIGS. 2 and 3, is provided with a longitudinal slot 72, which provides a means for attachment to the housing 34 thereto by means of a screw 74 adapted for extension through the slot 72 to be screwed into the bottom wall 33 of the housing. It is further to particularly noted from FIG. 3 that by the loosening of the screw 74 the housing 34 can be moved back and forth along the slot 72 in relation to the spacing of the wheel 28. The bottom 33 of the housing 34 is provided with spaced longitudinal parallel ridges 37 between which the bracket is retained to hold the housing and bracket in alignment. By tightening of the screw 74, the housing is retained in the adjusted position along the bracket 36.

Inwardly of the wheel 28, the end of the bracket 36 is provided with an outwardly and rearwardly extending arm or tongue 76 which is provided with an aperture 78. The end of the tongue 76 extends between opposed arms 80 and 82 of the clamp 38 which rearwardly are each provided with opposed semicircular extensions 84 and 86 respectively which are adapted to fit around the cart strut 22. The opposite arms 80 and 82 are clamped together by means of a screw 88 and nut 90 to retain the arm extensions 84–86 in position around the strut 22. Thus, by loosening of the nut 90 the clamp 38 may be moved up or down on the strut 22. The front end of the clamp arms 80–82 are inwardly provided with opposed trunnions 92–94 which are adapted to fit into the aperture 78 of the tongue extension 76 of the bracket 36 to thus provide a pivot bearing for the bracket in assembled position of the clamp to permit the bracket 36 together with the indicator housing 34 attached thereto to be swung out of the way for disposal alongside the strut 22 as illustrated in FIG. 2 when the cart 10 is being folded together.

In the assembled position of the device 32 on the wheel 28, the bracket and housing assembly is resiliently held down on the wheel by means of a spring 96 which is secured to the clamp screw 88 for extension along the outside of either clamp arm 80–82. The end of the spring 96 has a transversely bent hook portion 98 for engagement with a notch 100 provided at the upper surface of the bracket tongue 76 so that in the operative position of the device, as in FIGS. 3 and 4, the spring retains the pivotal bracket in position and exerts a resilient force to permit yielding of the contact wheel 44 as it rotates on the radial surface of the cart wheel 28 to compensate for irregularities in the radial surface of the cart wheel.

If it is desired to fold the device into the position as shown in FIG. 2, the hook portion 98 of the spring 96 need only be removed from the notch 100 whereafter the bracket 36 can be swung upwardly.

By means of the present novel arrangement an effective and accurate yardage indicator device for a handcart has been provided which is provided with novel adjustable support means to compensate for various cart designs and varying wheel diameters. In addition, the device can be conveniently folded up out of the way to permit folding of the cart.

The present invention may be embodied in certain other forms without departing from the essential spirit and characteristic thereof, therefore, the present embodiment is to be considered in all respects as illustrative only and not restrictive, the scope of the invention being indicated by the appended claims rather than by the foregoing description.

We claim:

1. A yardage indicator for golf carts and like devices having rolling ground wheels supports by struts, the indicator comprising: a clamp releasably fastenable to a wheel strut; a bracket having a tongue pivotally connect to the clamp and a flat elongated portion having an elongated slot therein, means for selectively securing the tongue in the clamp in at least two angular orientations; an indicator housing, fastener means extending through the slot and into the housing for selectively securing the housing in various linear positions relative to the bracket and, thus, relative to the strut; said housing having means coacting with the bracket to define a preferred angular orientation relative thereto; a shaft rotatably carried by the housing, a contact wheel on the shaft and engaging a ground wheel when the tongue is in one of said two angular positions but disengaged from the ground wheel when the tongue is in the other angular position; a gear set carried by the housing and rotated by the shaft when the contact wheel is driven by a ground wheel; and indicator means operated by the gear set to monitor the distance traveled by the ground wheel.

2. A yardage indicator as defined in claim 1 including a spring selectively operatively connected between the clamp and bracket for providing a bias on the bracket toward said one angular position.

* * * * *